(12) United States Patent
Giroux et al.

(10) Patent No.: US 10,255,075 B2
(45) Date of Patent: Apr. 9, 2019

(54) SYSTEM, METHOD, AND COMPUTER PROGRAM PRODUCT FOR MANAGING OUT-OF-ORDER EXECUTION OF PROGRAM INSTRUCTIONS

(71) Applicant: NVIDIA Corporation, Santa Clara, CA (US)

(72) Inventors: Olivier Giroux, Santa Clara, CA (US); Robert Ohannessian, Jr., Austin, TX (US); Jack H. Choquette, Palo Alto, CA (US); William Parsons Newhall, Jr., Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 952 days.

(21) Appl. No.: 13/945,822

(22) Filed: Jul. 18, 2013

(65) Prior Publication Data
US 2015/0026442 A1 Jan. 22, 2015

(51) Int. Cl.
*G06F 9/38* (2018.01)
(52) U.S. Cl.
CPC .................................. *G06F 9/3836* (2013.01)
(58) Field of Classification Search
CPC .............................. G06F 9/3838; G06F 9/3851
See application file for complete search history.

(56) References Cited

U.S. PATENT DOCUMENTS

| | | | | |
|---|---|---|---|---|
| 5,708,788 A * | 1/1998 | Katsuno | ................... | G06F 9/321 712/214 |
| 5,941,983 A * | 8/1999 | Gupta | ................... | G06F 9/3836 712/214 |
| 6,112,019 A * | 8/2000 | Chamdani | ............. | G06F 9/3836 712/214 |
| 9,164,772 B2 * | 10/2015 | Dockser | ................ | G06F 9/3814 |
| 2002/0144098 A1 * | 10/2002 | Wang | ................... | G06F 9/30072 712/221 |
| 2008/0270749 A1 * | 10/2008 | Ozer | ....................... | G06F 9/3822 712/23 |
| 2012/0204005 A1 * | 8/2012 | Dockser | ................ | G06F 9/3814 712/205 |
| 2015/0301831 A1 * | 10/2015 | Iyer | ....................... | G06F 9/3851 712/214 |

* cited by examiner

*Primary Examiner* — Jacob Petranek
(74) *Attorney, Agent, or Firm* — Zilka-Kotab, PC

(57) ABSTRACT

A method, system and computer program product embodied on a computer-readable medium are provided for managing the execution of out-of-order instructions. The method includes the steps of receiving a plurality of instructions and identifying a subset of instructions in the plurality of instructions to be executed out-of-order.

20 Claims, 13 Drawing Sheets

```
TEX     R0 <- [R1];
TEX     R2 <- [R3];
TEX     R4 <- [R5];
TEX     R6 <- [R7];
ADD     R0 <- R0 , R2;
ADD     R4 <- R4 , R6;
ADD     R0 <- R0 , R4;
MUL     R0 <- R0 , 0.25;
```

*Fig. 7A*

```
TEX then MOV    A0 <- [R0];
TEX then ADD    A0 <- [R1], A0;
TEX then ADD    A0 <- [R2], A0;
TEX then ADD    R0 <- [R3], A0;
MUL             R0 <- R0 , 0.25;
```

*Fig. 7B*

```
TEX     R0 <- [R1];
TEX     R2 <- [R3];
ADD     R0 <- R0 , R2;      //stall
TEX     R2 <- [R5];
ADD     R0 <- R0 , R2;      //stall
TEX     R2 <- [R7];
ADD     R0 <- R0 , R2;      //stall
MUL     R0 <- R0 , 0.25;
```

740

```
TEX        R0 <- [R0];
TEX        R4 <- [R1];
{texture} ADD  R0 <- R0 , R4;
TEX        R4 <- [R2];
{texture} ADD  R0 <- R0 , R4;
TEX        R4 <- [R3];
{texture} ADD  R0 <- R0 , R4;
MUL        R0 <- R0 , 0.25;
```

*Fig. 7D*

SYSTEM, METHOD, AND COMPUTER PROGRAM PRODUCT FOR MANAGING OUT-OF-ORDER EXECUTION OF PROGRAM INSTRUCTIONS

FIELD OF THE INVENTION

The present invention relates to computer architectures, and more particularly to management of ordered execution of program instructions.

BACKGROUND

Conventionally, a software developer designs programs that are compiled and executed by a processor. A program consists of a number of instructions written in a sequential order. The programming model is typically viewed as the instructions being executed in the same order that the instructions are ordered in the program. However, various computer architectures may enable certain program instructions to be executed out-of-order. For example, a first instruction may specify an arithmetic operation such as C=A+B and a second instruction, sequentially ordered after the first instruction, may specify an arithmetic operation such as E=D*D. The compiler may analyze the program and reorder the first and second instructions such that the second instruction is executed before the first instruction. The reordering of instructions enables certain efficiencies to be realized such as by moving long-latency operations closer to the beginning of the program.

The instructions included in the above example can be reordered because there are no dependencies between the instructions. In other words, the second instruction does not include an operand that is affected by the execution of the first instruction. However, other instructions may have dependencies that do not allow such reordering of the instructions. For example, a first instruction may load a value from an address in RAM (Random-Access Memory) into a register, and a second instruction may perform an arithmetic operation that utilizes the value in the register as an operand of the arithmetic operation. In this case, the second instruction cannot be executed before the first instruction because the second instruction has a dependency on the first instruction.

In addition, some program instructions may be associated with a long latency in order to generate a result. In other words, the processor may require a large number of clock cycles to execute the instruction. For example, while accessing a value in a memory sub-system, the processor may wait for hundreds or thousands of clock cycles for the memory sub-system to return the value stored at a particular memory address. During operations associated with a long-latency, the registers associated with the operations may be reserved for a large number of clock cycles even though the registers do not store useful data for a large majority of those clock cycles.

One technique to hide latency enables other operations to be executed while one or more long-latency operations are in flight. In order to allow for additional operations to be executed while long-latency operations are waiting to be completed, the compiler may use different registers in the register the to perform the additional operations. The size of a register file associated with an execution thread may be increased to enable other operations to be executed substantially in parallel with the long-latency operation. However, the amount of latency that can be hidden using this technique is bounded by the number of available registers and the number of independent instructions in the program that can be executed out-of-order. It will be appreciated that increasing the size of the register file takes up a vital resource (i.e., surface area of the silicon chip) that increases the cost of the design. Furthermore, increasing the size of the register file also requires more power to access data stored in the register file, making the processor less power efficient. Consequently, increasing the register file is an expensive solution to this problem. Thus, there is a need for managing the execution order of program instructions that addresses this issue and/or other issues associated with the prior art.

SUMMARY

A method, system and computer program product embodied on a computer-readable medium are provided for managing the execution of out-of-order instructions. The method includes the steps of receiving a plurality of instructions and identifying a subset of instructions in the plurality of instructions to be executed out-of-order.

BRIEF DESCRIPTION OF THE DRAWINGS

FIG. 7A illustrates pseudocode for a one-dimensional reductive texture sampling program, in accordance with one embodiment;

FIG. 7B illustrates pseudocode for implementing the one-dimensional reductive texture sampling program of FIG. 7A using out-of-order processing with operation chaining, in accordance with one embodiment;

FIG. 7D illustrates pseudocode annotated to indicate which instructions can be executed out-of-order, in accordance with one embodiment;

DETAILED DESCRIPTION

The following description discloses a technique for managing out-of-order execution of program instructions. A program may be generated by a software designer using a high-level programming language. Alternatively, programs may be generated dynamically by an application running on a processor. A software module, executed by a processor, is configured to analyze the program to determine which instructions in the program can be executed out-of-order. For those program instructions that can be executed out-of-order, the software module indicates that the instruction can be executed out-of-order in metadata associated with the instruction. The metadata may be included within the instructions themselves or be included as additional data in addition to the instructions. The instructions and metadata are then transmitted to a processor for execution.

The processor is configured to analyze the metadata associated with each instruction. If the instruction can be executed out-of-order, then the processor adds the instruction to a particular queue to be executed out-of-order. The queue enables the instructions in the queue to be executed out-of-order based on the completion of the execution of a predecessor instruction. In other words, a first instruction from the queue is decoded and transmitted to a functional execution unit for processing. When the first instruction has completed execution, the next instruction in the queue is popped from the front of the queue, decoded, and transmitted to a functional execution unit for processing. Multiple queues may be implemented such that the execution of instructions stored in separate queues may be dispatched to an execution unit out-of-order when compared to the sequential order of instructions received by the processor. In one embodiment, the metadata for an instruction indicates which queue the instruction should be added to by a scheduler unit. The metadata may include a queue identifier such as a queue number or a queue name. In one embodiment, the metadata comprises a single bit that indicates whether the instruction can be executed out-of-order and the processing unit determines, based on the operation code (opcode) of the instruction, which queue the instruction should be added to.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1:
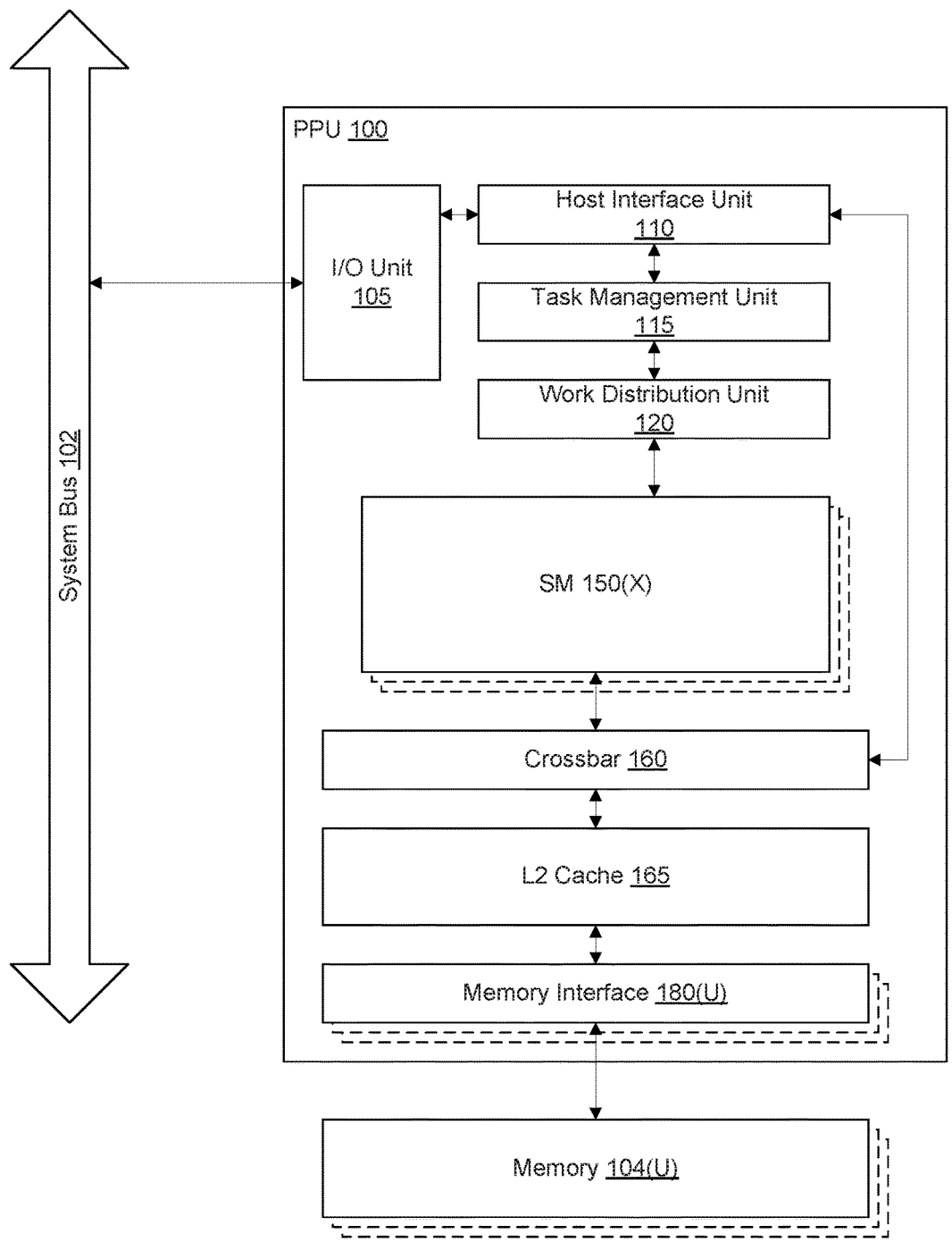
FIG. 1 illustrates a parallel processing unit, according to one embodiment.

FIG. 1 illustrates a parallel processing unit (PPU) 100, according to one embodiment. While a parallel processor is provided herein as an example of the PPU 100, it should be strongly noted that such processor is set forth for illustrative purposes only, and any processor may be employed to supplement and/or substitute for the same. In one embodiment, the PPU 100 is configured to execute a plurality of threads concurrently in two or more streaming multi-processors (SMs) 150. A thread (i.e., a thread of execution) is an instantiation of a set of instructions executing within a particular SM 150. Each SM 150, described below in more detail in conjunction with FIG. 2, may include, but is not limited to, one or more processing cores, one or more load/store units (LSUs), a level-one (L1) cache, shared memory, and the like.

In one embodiment, the PPU 100 includes an input/output (I/O) unit 105 configured to transmit and receive communications (i.e., commands, data, etc.) from a central processing unit (CPU) (not shown) over the system bus 102. The I/O unit 105 may implement a Peripheral Component interconnect Express (PCIe) interface for communications over a PCIe bus. In alternative embodiments, the I/O unit 105 may implement other types of well-known bus interfaces.

The PPU 100 also includes a host interface unit 110 that decodes the commands and transmits the commands to the task management unit 115 or other units of the PPU 100 (e.g., memory interface 180) as the commands may specify. The host interface unit 110 is configured to route communications between and among the various logical units of the PPU 100.

In one embodiment, a program encoded as a command stream is written to a buffer by the CPU. The buffer is a region in memory, e.g., memory 104 or system memory, that is accessible (i.e., read/write) by both the CPU and the PPU 100. The CPU writes the command stream to the buffer and then transmits a pointer to the start of the command stream to the PPU 100. The host interface unit 110 provides the task management unit (TMU) 115 with pointers to one or more streams. The TMU 115 selects one or more streams and is configured to organize the selected streams as a pool of pending grids. The pool of pending grids may include new grids that have not yet been selected for execution and grids that have been partially executed and have been suspended.

A work distribution unit 120 that is coupled between the TMU 115 and the SMs 150 manages a pool of active grids, selecting and dispatching active grids for execution by the SMs 150. Pending grids are transferred to the active grid pool by the TMU 115 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 120. In addition to receiving grids from the host interface unit 110 and the work distribution unit 120, the TMU 115 also receives grids that are dynamically generated by the SMs 150 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 100. An application may include instructions (i.e., API calls) that cause the driver kernel to generate one or more grids for execution. In one embodiment, the PPU 100 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 100 comprises X SMs 150(X). For example, the PPU 100 may include 15 distinct SMs 150. Each SM 150 is multi-threaded and configured to execute a plurality of threads (e.g., 32 threads) from a particular thread block concurrently. Each of the SMs 150 is connected to a level-two (L2) cache 165 via a crossbar 160 (or other type of interconnect network). The L2 cache 165 is connected to one or more memory interfaces 180. Memory interfaces 180 implement 16, 32, 64, 128-bit data buses, or the like, for high-speed data transfer. In one embodiment, the PPU 100 comprises U memory interfaces 180(U), where each memory interface 180(U) is connected to a corresponding memory device 104(U). For example, PPU 100 may be connected to up to 6 memory devices 104, such as graphics double-data-rate, version 5, synchronous dynamic random access memory (GDDR5 SDRAM).

In one embodiment, the PPU 100 implements a multi-level memory hierarchy. The memory 104 is located off-chip in SDRAM coupled to the PPU 100. Data from the memory 104 may be fetched and stored in the L2 cache 165, which is located on-chip and is shared between the various SMs 150. In one embodiment, each of the SMs 150 also implements an L1 cache. The L1 cache is private memory that is dedicated to a particular SM 150. Each of the L1 caches is coupled to the shared L2 cache 165. Data from the L2 cache 165 may be fetched and stored in each of the L1 caches for processing in the functional units of the SMs 150.

In one embodiment, the PPU 100 comprises a graphics processing unit (GPU). The PPU 100 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system as well as attributes associated with each vertex of the primitive. The PPU 100 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, shader, geometry shader, pixel shader, etc. For example, the TMU 115 may configure one or more SMs 150 to execute a vertex shader program that processes a number of vertices defined by the model data. In one embodiment, the TMU 115 may configure different SMs 150 to execute different shader programs concurrently. For example, a first subset of SMs 150 may be configured to execute a vertex shader program while a second subset of SMs 150 may be configured to execute a pixel shader program. The first subset of SMs 150 processes vertex data to produce processed vertex data and writes the processed vertex data to the L2 cache 165 and/or the memory 104. After the processed vertex data is rasterized (i.e., transformed from three-dimensional data into two-dimensional data in screen space) to produce fragment data, the second subset of SMs 150 executes a pixel shader to produce processed fragment data, which is then blended with other processed fragment data and written to the frame buffer in memory 104. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 100 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 100 is embodied on a single semiconductor substrate. In another embodiment, the PPU 100 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 100 may be included on a graphics card that includes one or more memory devices 104 such as GDDR5 SDRAM. The graphics card may be configured to interface with a PCIe slot on a motherboard of a desktop computer that includes, e.g., a northbridge chipset and a southbridge chipset. In yet another embodiment, the PPU 100 may be an integrated graphics processing unit (iGPU) included in the chipset (i.e., Northbridge) of the motherboard.

Figure 2:
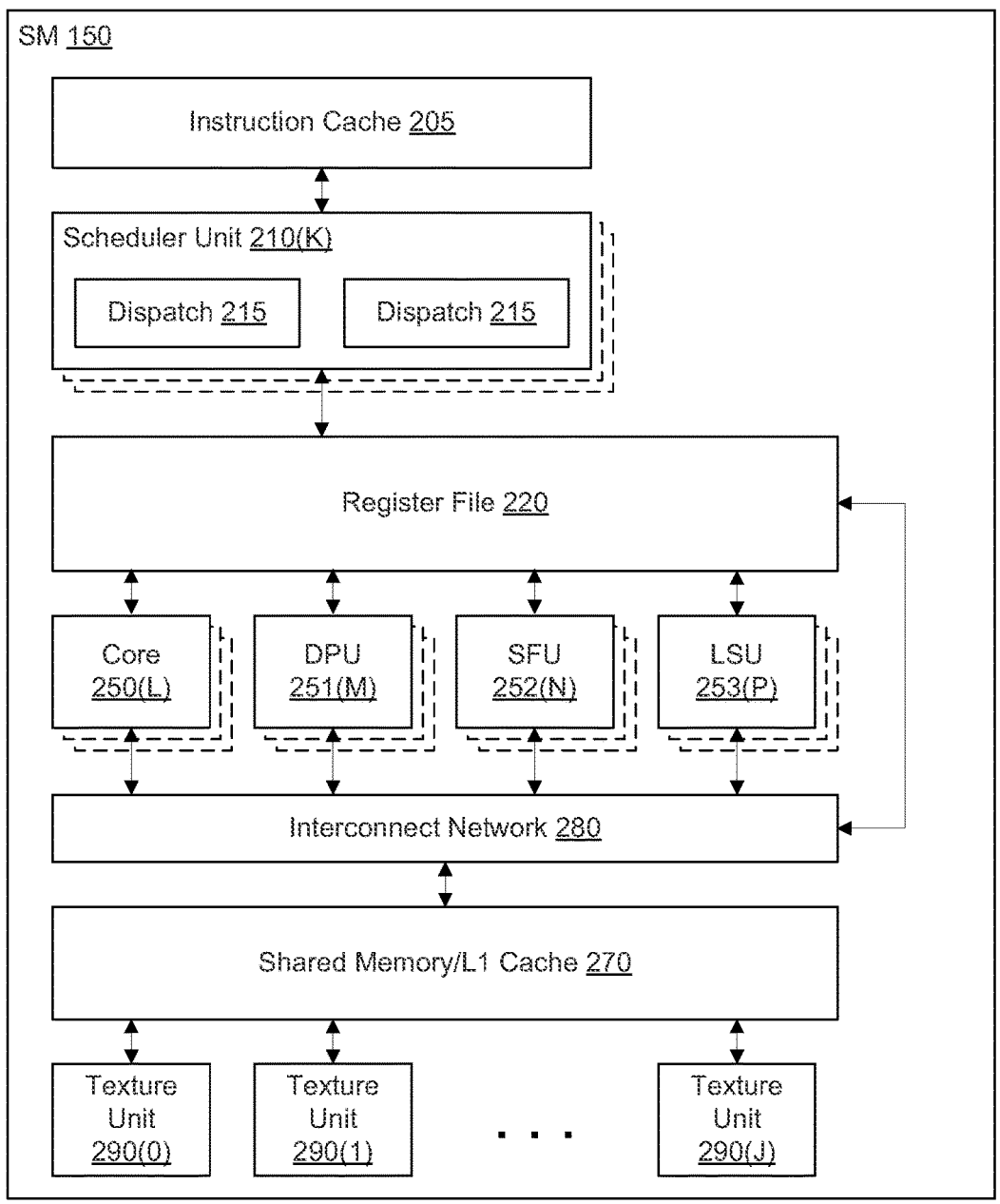
FIG. 2 illustrates the streaming multi-processor of FIG. 1, according to one embodiment.

FIG. 2 illustrates the streaming multi-processor 150 of FIG. 1, according to one embodiment. As shown in FIG. 2, the SM 150 includes an instruction cache 205, one or more scheduler units 210, a register file 220, one or more processing cores 250, one or more double precision units (DPUs) 251, one or more special function units (SFUs) 252, one or more load/store units (LSUs) 253, an interconnect network 280, a shared memory/L1 cache 270, and one or more texture units 290.

As described above, the work distribution unit 120 dispatches active grids for execution on one or more SMs 150 of the PPU 100. The scheduler unit 210 receives the grids from the work distribution unit 120 and manages instruction scheduling for one or more thread blocks of each active grid. The scheduler unit 210 schedules threads for execution in groups of parallel threads, where each group is called a warp. In one embodiment, each warp includes 32 threads. The scheduler unit 210 may manage a plurality of different thread blocks, allocating the thread blocks to warps for execution and then scheduling instructions from the plurality of different warps on the various functional units i.e., cores 250, DPUs 251, SFUs 252, and LSUs 253) during each clock cycle.

In one embodiment, each scheduler unit 210 includes one or more instruction dispatch units 215. Each dispatch unit 215 is configured to transmit instructions to one or more of the functional units. In the embodiment shown in FIG. 2, the scheduler unit 210 includes two dispatch units 215 that enable two different instructions from the same warp to be dispatched during each clock cycle. In alternative embodiments, each scheduler unit 210 may include a single dispatch unit 215 or additional dispatch units 215.

Each SM 150 includes a register file 220 that provides a set of registers for the functional units of the SM 150. In one embodiment, the register file 220 is divided between each of the functional units such that each functional unit is allocated a dedicated portion of the register file 220. In another embodiment, the register file 220 is divided between the different warps being executed by the SM 150. The register file 220 provides temporary storage for operands connected to the data paths of the functional units.

Each SM 150 comprises L processing cores 250. In one embodiment, the SM 150 includes a large number (e.g., 192, etc.) of distinct processing cores 250. Each core 250 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 150 also comprises M DPUs 251 that implement double-precision floating point arithmetic, N SFUs 252 that perform special functions (e.g., copy rectangle, pixel blending operations, and the like), and P LSUs 253 that implement load and store operations between the shared memory/L1 cache 270 and the register file 220. In one embodiment, the SM 150 includes 64 DPUs 251, 32 SFUs 252, and 32 LSUs 253.

Each SM 150 includes an interconnect network 280 that connects each of the functional units to the register file 220 and the shared memory/L1 cache 270. In one embodiment, the interconnect network 280 is a crossbar that can be configured to connect any of the functional units to any of the registers in the register file 220 or the memory locations in shared memory/L1 cache 270.

In one embodiment, the SM 150 is implemented within a GPU. In such an embodiment, the SM 150 comprises J texture units 290. The texture units 290 are configured to load texture maps (i.e., a 2D array of texels) from the memory 104 and sample the texture maps to produce sampled texture values for use in shader programs. The texture units 290 implement texture operations such as anti-aliasing operations using mip-maps (i.e., texture maps of varying levels of detail). In one embodiment, the SM 150 includes 16 texture units 290.

The PPU 100 described above may be configured to perform highly parallel computations much faster than conventional CPUs. Parallel computing has advantages in graphics processing, data compression, biometrics, stream processing algorithms, and the like.

Out-of-Order Execution

Figure 3A:
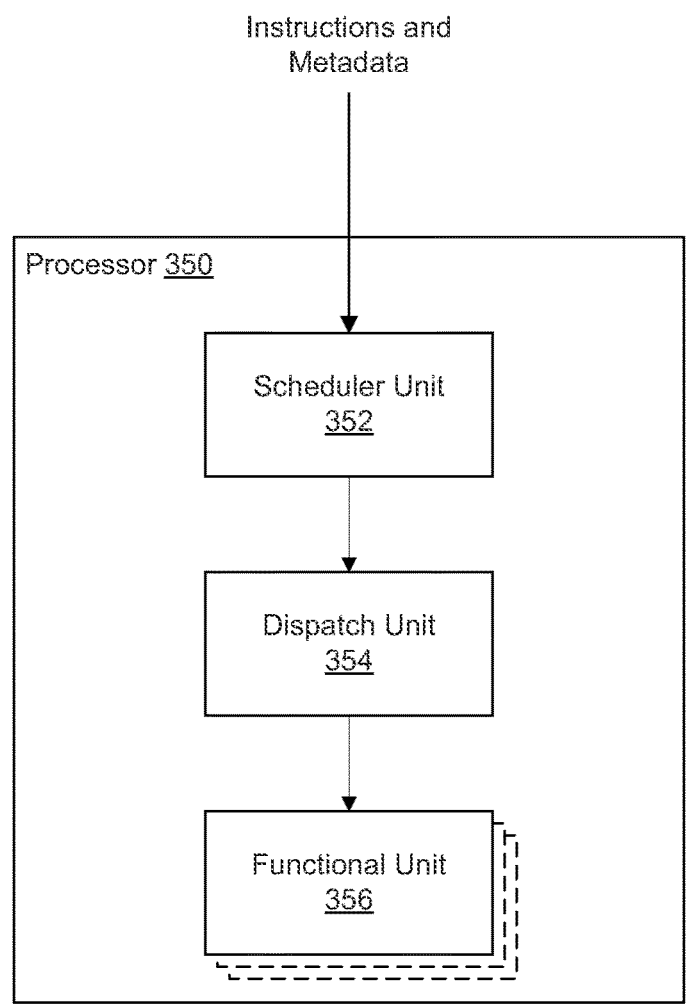
FIG. 3A illustrates a processor configured to manage out-of-order execution of a plurality of program instructions, in accordance with one embodiment.

FIG. 3A illustrates a processor 350 configured to manage out-of-order execution of a plurality of program instructions, in accordance with one embodiment. A software module analyzes a program and determines which instructions of the program can be executed out-of-order. The software module may be executed by the processor 350 or a co-processor (not explicitly shown). For example, the processor 350 may be the PPU 100 and the software module may be executed by a CPU coupled to the PPU 100. The software module annotates the instructions to indicate whether each of the instructions can be executed out-of-order. The instructions may include a field that indicates whether the instruction can be executed out-of-order. In another embodiment, the instruction is associated with external metadata that is transmitted to the processor 350 with the instruction.

Figure 3B:
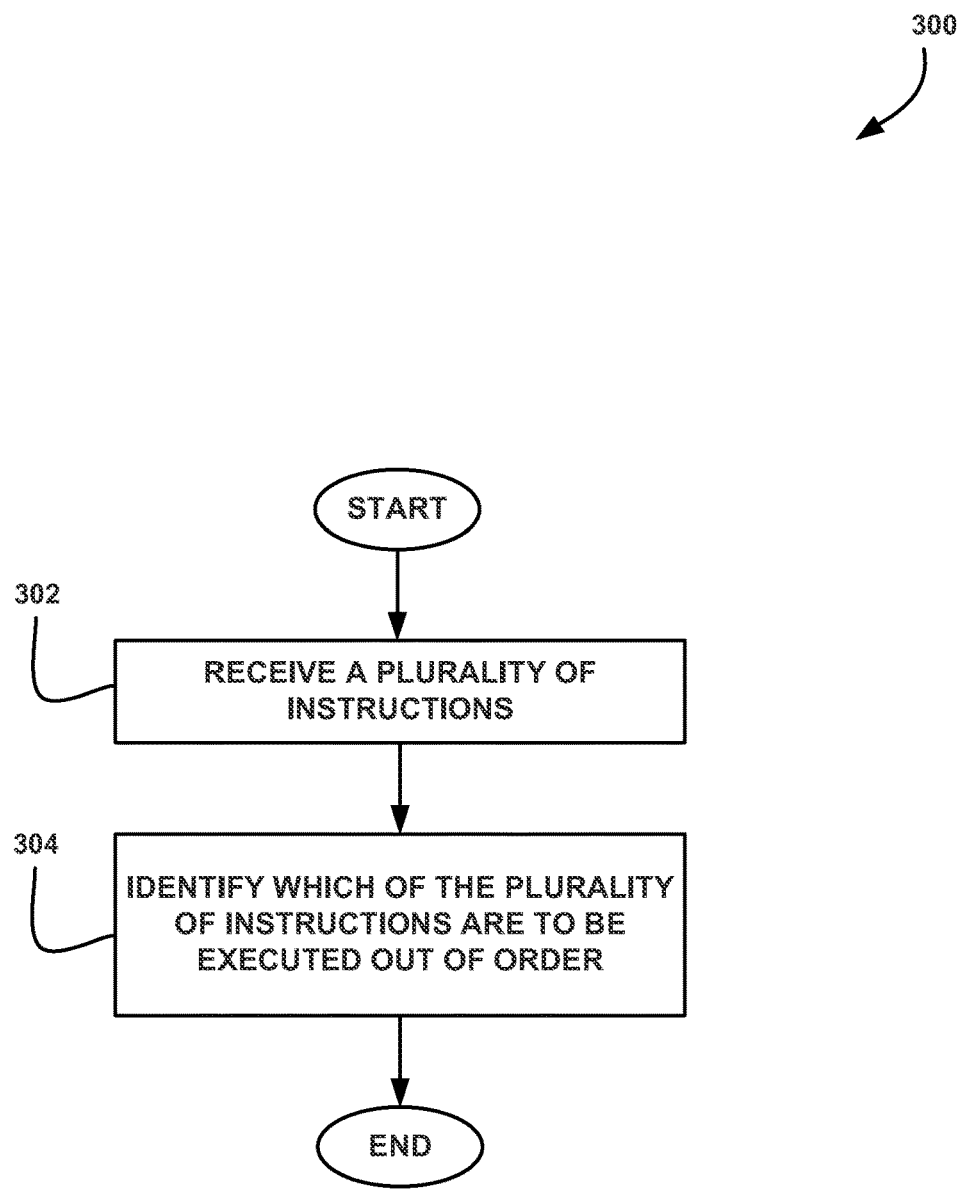
FIG. 3B illustrates a flowchart of a method for managing out-of-order execution for a plurality of instructions, in accordance with one embodiment.

FIG. 3B illustrates a flowchart of a method 300 for managing out-of-order execution for a plurality of instructions, in accordance with one embodiment. At step 302, a processor 350 receives a plurality of instructions. At step 304, the processor 350 determines whether one or more of the plurality of instructions should be executed out-of-order. For each instruction received by the processor 350, the scheduler unit 352 analyzes the instruction to determine whether the instruction can be executed out-of-order. In one embodiment, the scheduler unit 352 reads the metadata associated with the instruction to determine whether the instruction can be executed out-of-order. The scheduler unit 352 may not decode the instruction at this time. If the instruction cannot be executed out-of-order, then the scheduler unit 352 may transmit the instruction to a dispatch unit 354 to be decoded and transmitted to a functional unit 356 (e.g., an ALU, floating point unit, etc.) for execution. The dispatch unit 354 may store the instruction in a queue such that the scheduler unit 352 and dispatch unit 354 can operate asynchronously from the functional unit.

However, if the scheduler unit 352 determines that the instruction cat be executed out-of-order, then the scheduler unit 352 may push the instruction into a queue. In one embodiment, the scheduler unit 352 maintains a plurality of virtual queues (i.e., FIFOs) that track instructions that can be executed out-of-order. The virtual queues may be implemented as circular FIFOs in a memory associated with the processor, such as on-chip RAM. Each virtual queue may separately manage a number of instructions that can be executed out-of-order with respect to the order that the instructions were received by the processor 350. However, the instructions in a particular virtual queue are executed in-order with respect to the other instructions in the virtual queue. In other words, when a previous instruction from the virtual queue has completed execution, the next instruction from the front of the virtual queue may be popped from the virtual queue by the scheduler unit and forwarded to the dispatch unit 354 to be decoded and transmitted to a functional unit 356 for execution. Returning to FIG. 3A, when the program is executed by the processor 350, the scheduler unit 352 receives the plurality of instructions.

In another embodiment, the technique for managing out-of-order execution of program instructions may be implemented on the PPU 100 described in FIGS. 1 and 2. As described above, the scheduler unit 210 of PPU 100 is configured to receive instructions, arbitrate which instructions are ready for execution, and transmit the instructions to one of the dispatch units 215 to be decoded and transmitted to one of the functional units. In one embodiment, scheduler unit 210 maintains a plurality of virtual queues in a dedicated memory that track the execution order for the program instructions that can be executed out-of-order. Each of the virtual queues may store a number of instructions that are executed sequentially with respect to the other instructions in the virtual queue. Instructions may be executed out-of-order by adding the instructions to the various virtual queues. In one embodiment, the virtual queues may be implemented in a dedicated, on-chip memory (i.e., SRAM) within the scheduler unit 210.

In one embodiment, each instruction received by the scheduler unit 210 is associated with metadata that indicates which of the virtual queues the instruction should be added to in order to maintain proper execution order with dependent instructions. For example, the metadata may include a field that indicates a virtual queue number that the instruction should be added to. This field is filled by a software module that manages out-of-order execution of program instructions.

In one embodiment, the software module is included within a compiler implemented in the driver kernel for the PPU 100. The compiler receives API calls from an application that define program instructions to be executed by the PPU 100. The compiler translates these program instructions into microcode that is compatible with the hardware architecture of the PPU 100. The compiler may then analyze the microcode to determine which program instructions may be executed out-of-order, annotating the instructions with data that indicates whether the instructions can be executed out-of-order. Program instructions are executed out-of-order when the instruction is executed in a different sequential order from where the program instruction was ordered as transmitted to the PPU 100. The compiler may indicate that one or more instructions can be executed out-of-order by generating metadata associated with the one or more instructions. Alternatively, the compiler may analyze the program instructions and annotate the program instructions prior to the instructions being translated into microcode.

In one embodiment, each instruction in a program is associated with metadata. The metadata may be stored in a field of the instruction. For example, if an instruction is 64 bits wide, 10-bits may represent the metadata associated with the instruction. In another embodiment, the metadata may be stored separate from the instruction and transmitted to the processing unit along with the instruction. For example, 10-bits of metadata may be transmitted to the processing unit along with the 64-bit instruction.

Figure 4:
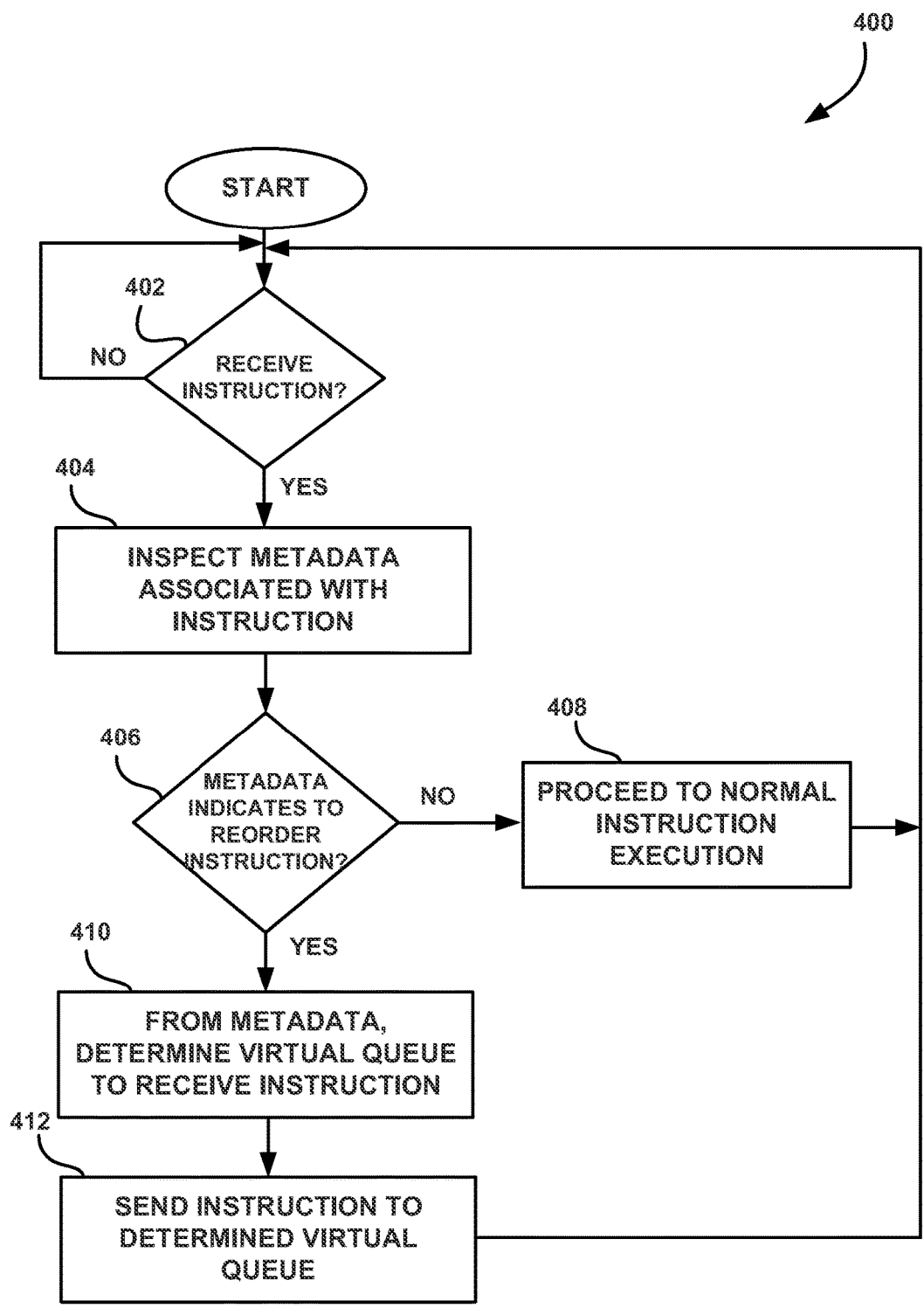
FIG. 4 illustrates a flowchart of a method for performing out-of-order execution of program instructions, in accordance with one embodiment.

FIG. 4 illustrates a flowchart of a method 400 for performing out-of-order execution of program instructions, in accordance with one embodiment. The method 400 may be performed by the scheduler unit 210 of the PPU 100. At step 402, a processing unit determines whether an instruction has been received. If an instruction has not been received, then the processing unit waits for an instruction. In one embodiment, the scheduler unit 210 waits to receive an instruction transmitted to the SM 150 by the WDU 120. However, if an instruction has been received, then, at step 404, the processing unit inspects metadata associated with the instruction. In one embodiment, the scheduler unit 210 inspects the metadata associated with the instruction to determine whether the instruction may be executed out-of-order. At step 406, the processing unit determines whether the metadata indicates that the instruction should be executed out-of-order. The metadata may include a field that indicates whether the instruction can be executed out-of-order. A special value for the field may be used to indicate that the instruction cannot be executed out-of-order. For example, the metadata may include a number of bits that indicate which virtual queue the instruction should be added to. A value of 0x00 may indicate that the instruction cannot be executed out-of-order and the instruction should be transmitted to a dispatch unit 215 to be executed by a functional unit of the PPU 100 once the instruction's dependencies have been resolved. A value other than 0x00 may indicate a number of a virtual queue (e.g., 0x01, 0x02, etc.) that the instruction should be added to. If the metadata indicates that the instruction should not be reordered, then, at step 408, the processing unit proceeds to execute the instruction in the normal order. Again, in one embodiment, when the metadata indicates that the instruction cannot be executed out-of-order, then the instruction is transmitted to the dispatch unit 215 to be executed immediately. Then, the method then returns to step 402 to wait for the next instruction.

Returning to step 406, if the metadata indicates that the instruction can be reordered, then, at step 410, the processing unit determines where to send the instruction based on the metadata. Again, the instruction may be sent to one or more virtual queues in a memory associated with the processing unit. The particular virtual queue may be indicated by a value included in the metadata. At step 412, the processing unit transmits the instruction to the selected virtual queue. Instructions are popped from the virtual queues in order as the previous instruction for a virtual queue is completed. Instructions from different virtual queues may be executed out-of-order with respect to instructions in other virtual queues while instructions from a particular virtual queue are executed in-order with respect to instructions in that particular virtual queue. After step 412, the method returns to step 402 to wait for the next instruction.

Figure 5:
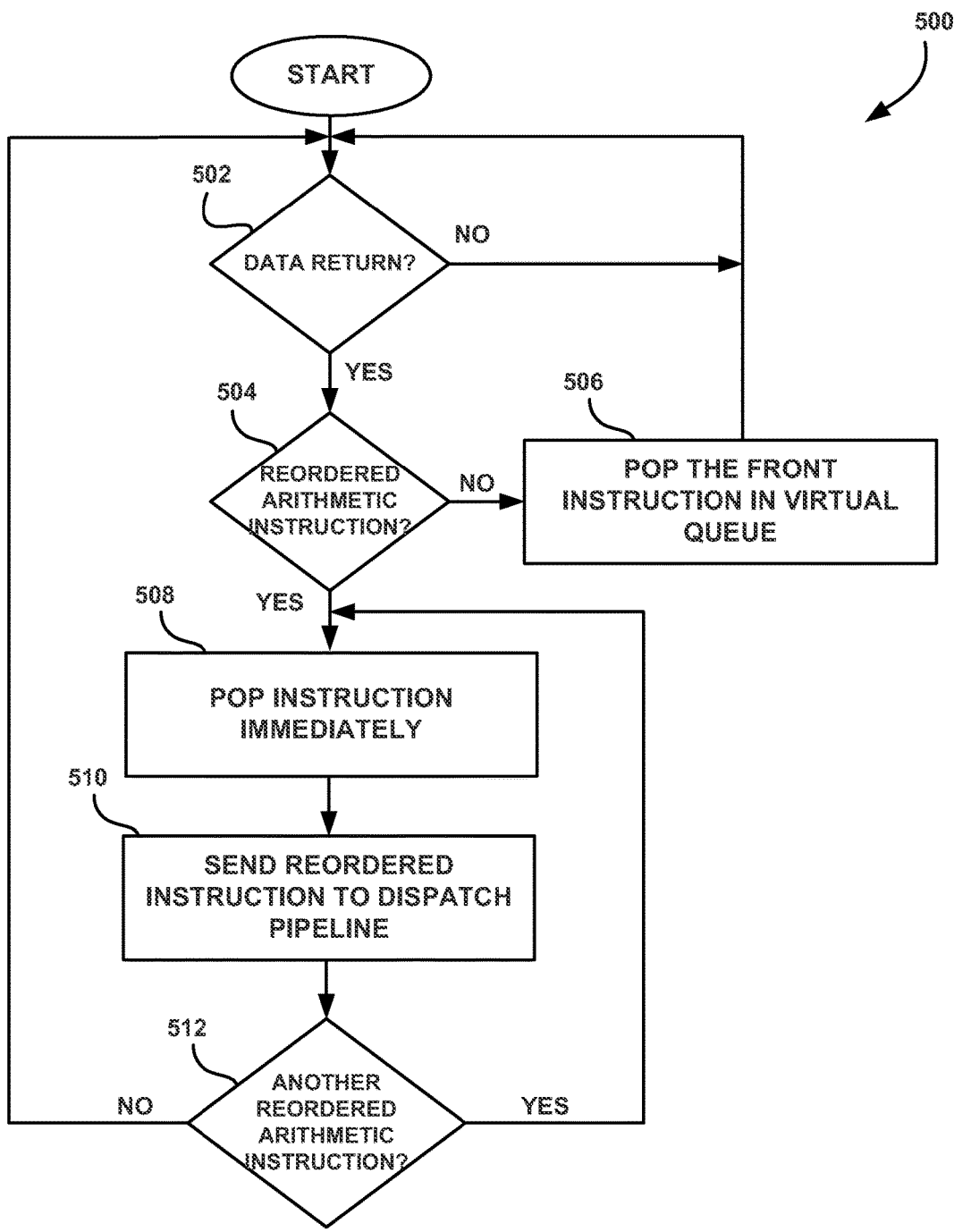
FIG. 5 illustrates a flowchart of a method for dispatching instructions from a virtual queue, in accordance with one embodiment.

FIG. 5 illustrates a flowchart of a method 500 for dispatching instructions from a virtual queue, in accordance with one embodiment. At step 502, a processing unit determines whether data has been returned based on the execution of a previously issued instruction from the virtual queue. In other words, the processing unit determines whether the previously issued instruction from the virtual queue has completed execution. In one embodiment, the SM 150 maintains state information for previously issued instructions. The state information is updated when the instruction has been executed. The scheduler unit 210 may track whether data has been returned for a previously issued instruction from the virtual queue by reading the state information. In another embodiment, the scheduler unit 210 receives messages from the WDU 120 or the SM 150 whenever an operation has been completed. The scheduler unit 210 can respond to these messages by selecting another instruction to transmit to the dispatch unit 215. If the data has not been returned, then the processing unit is stalled and waits for the data to be returned. However, if the data has been returned, then, at step 504, the processing unit determines whether the instruction at the front of the virtual queue is a reordered arithmetic instruction. In one embodiment, multiple reordered arithmetic instructions may be dispatched at the same time after a preceding instruction has returned data. If the instruction is not a reordered arithmetic instruction, then, at step 506, the processing unit pops the instruction from the virtual queue and transmits the instruction to the dispatch unit 215 for execution. The method 500 then returns to step 502 to wait for new data to be returned from the execution of the instruction.

Returning to step 504, if the instruction at the front of the virtual queue is a reordered arithmetic instruction, then, at step 508, the processing unit pops the instruction from the virtual queue. At step 510, the processing unit transmits the reordered arithmetic instruction to a dispatch pipeline. In one embodiment, the scheduler unit 210 pops the instruction from a virtual queue and transmits the instruction to one of the dispatch units 215 to be decoded and transmitted to a functional unit for execution. At step 512, the processing unit determines whether the next instruction in the virtual queue is a reordered arithmetic instruction. If the next instruction in the virtual queue is a reordered arithmetic instruction, then, the method 500 returns to step 508 and the next instruction is popped from the virtual queue immediately and transmitted to the dispatch pipeline. However, at step 512, if the next instruction in the virtual queue is not a reordered arithmetic instruction, then the method 500 returns to step 502 to wait for new data to be returned.

Figure 6:
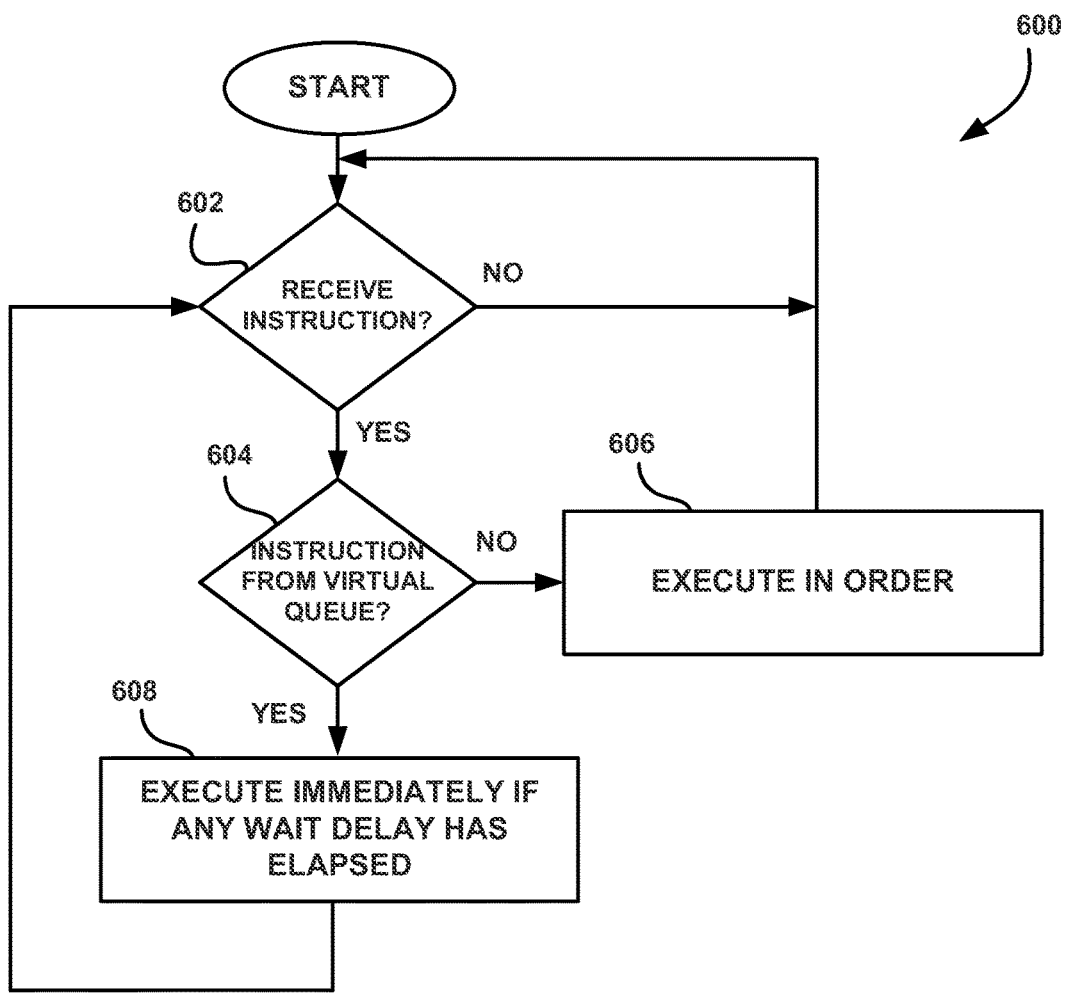
FIG. 6 illustrates a flowchart of a method for ordering instructions for execution, in accordance with one embodiment.

FIG. 6 illustrates a flowchart of a method 600 for ordering instructions for execution, in accordance with one embodiment. At step 602, the processing unit determines whether an instruction has been received. In one embodiment, the dispatch unit 215 receives instructions from the scheduler unit 210 to be decoded and transmitted to one of the functional units for execution. The dispatch unit 215 may implement a FIFO that stores instructions to be executed in the order the instructions are received from the scheduler unit 210. If the instruction has not been received, then the processing unit is stalled and waits for the instruction. However, if the instruction has been received, then, at step 604, the processing unit determines whether the instruction originates from a virtual queue. If the instruction does not originate from any virtual queue, then, at step 606, the instruction is executed in-order. In one embodiment, the dispatch unit 215 executes the instruction in-order by adding the instruction to the FIFO, where the instruction is executed in the order the instruction was received from the scheduler unit 210.

Returning to step 604, if the instruction originates from any virtual queue, then, at step 608, the instruction is executed immediately if a delay has elapsed. The delay may be implemented to avoid various pipeline hazards. Alternatively, the delay could be avoided using various scoreboarding techniques localized in the dispatch pipeline. In one embodiment, the delay ensures that the instruction cannot be decoded and issued unless at least N clock cycles (e.g., 6 clock cycles) have elapsed since the last instruction for an arithmetic operation was issued. In one embodiment, the dispatch unit 215 executes the instruction immediately by transmitting the instruction to the functional units, thereby bypassing the FIFO of other instructions waiting to be dispatched that were received from the scheduler unit 210 prior to the instruction. The method 600 then returns to step 602 to wait for another instruction.

FIG. 7A illustrates pseudocode 710 for a one-dimensional reductive texture sampling program, in accordance with one embodiment. The reductive texture sampling program samples a texture map to generate four texture values and then calculates an average texture value for the four sample texture values. The program shown in FIG. 7A is provided for illustrative purposes only and is only one example program of many possible programs. As shown in FIG. 7A, the pseudocode 710 includes a plurality of instructions utilizing eight registers. The first four instructions specify texture operations that are executed by the texture units 290 of the PPU 100. The texture operations take input from a single register and return output stored in a single register. Following the first four instructions are four additional instructions that specify arithmetic operations executed by the cores 250 or the DPUs 251.

As shown in FIG. 7A, the first texture operation receives input from register R1 and stores an output in register R0, the second texture operation receives input from register R3 and stores an output in register R2, the third texture operation receives input from register R5 and stores an output in register R4, and the fourth texture operation receives input from register R7 and stores an output in register R6. Registers R1, R3, R5, and R7 may store a texture coordinate that indicates an index into the texture map. The texture operations are high latency operations processed over a number of clock cycles by the texture pipelines of the texture units 290. It will be appreciated that the allocation lifetimes of registers R0, R2, R4, and R6 are relatively long (i.e., due to the high latency of the texture operation) while the amount of time that these registers hold valid data may be relatively short. In other words, the registers are allocated when the texture operation is transmitted to the texture units 290, but the valid data is only stored in the registers once the texture pipelines have produced corresponding texture values. Once the data in the registers is valid, the arithmetic operations may be performed, thereby summing each of the four values and multiplying the result by 0.25 to generate an average value for the four texture operations.

FIG. 7B illustrates pseudocode 720 for implementing the one-dimensional reductive texture sampling program of FIG. 7A using out-of-order processing with operation chaining, in accordance with one embodiment. The pseudocode 720 implements similar operations to pseudocode 710, but enables out-of-order execution (i.e., the order of the second and third chained texture/arithmetic operations may be switched, or executed substantially in parallel). In one embodiment, the architecture of an SM 150 enables operation chaining of two or more operations. Operation chaining reduces issues caused by allocation of registers to long-latency operations by committing results from one operation to direct and immediate consumption by a different processing unit.

As shown in FIG. 7B, the pseudocode 720 includes a plurality of chained operations. A first instruction specifies a first chained operation that causes a texture operation to be performed that receives input from register R0 and generates an output that is added to an accumulator value in a register A0. In other words, the value generated by the texture operation is committed to an arithmetic operation such that the value does not need to be temporarily stored in a register. In one embodiment, the PPU 100 may be configured to implement chained operations by configuring an interconnect, such as the interconnect network 280, to couple the output of one functional unit (e.g., a texture unit 290) with the input of another functional unit (e.g., a core 250). The pseudocode 720 also includes a second instruction that specifies a second chained operation that causes a texture operation to be performed that receives input from register R1 and generates an output that is added to the accumulator value in the register A0, a third instruction that specifies a third chained operation that causes a texture operation to be performed that receives input from register R2 and generates an output that is added to the accumulator value in the register A0, and a fourth instruction that specifies a fourth chained operation that causes a texture operation to be performed that receives input from register R3 and generates an output that is added to the accumulator value in the register A0 and stored in register R0. The pseudocode 720 also includes a final instruction that specifies an arithmetic instruction to be performed that multiplies the value in the register R0 by 0.25 to generate an average value of the four texture operations, which is stored in register R0.

Figure 7C:
FIG. 7C illustrates pseudocode the represents a sequential program similar to the program of FIG. 7B, in accordance with one embodiment.

FIG. 7C illustrates pseudocode 730 the represents a sequential program similar to the program of FIG. 7B, in accordance with one embodiment. The pseudocode 730 reduces the number of registers that are used to generate a result for the reductive texture sampling program when compared to the pseudocode 710. However, each of the texture operations must be executed in-order, making the latency of each texture operation highly visible in the latency of the overall operation. Without out-of-order execution, the sequential programming model imposes impractical stalling using the same (or similar) register allocation.

As shown in FIG. 7C, the program utilizes six registers (i.e., R0, R1, R2, R3, R5, and R7). The first two instructions specify texture operations that receive input from registers and R3 and store outputs in registers R0 and R2, respectively. The third instruction is then stalled until the first two operations are complete. Once the first two operations are complete, the third instruction specifies an arithmetic operation that sums the results of the first two texture operations and stores the result in register R0. The next instruction specifies a third texture operation that receives input from register R5 and stores an output in register R2. The register R2 may be reused because the result of the second texture operation is no longer needed after being added to the value stored in register R0. The next instruction specifies another arithmetic operation that sums the result of the third texture operation with the value stored in register R0. Again, this instruction is stalled until the result of the third texture operation has been stored in register R2. The next instruction specifies a fourth texture operation that receives input from register R7 and stores an output in register R2. After the output from the fourth texture operation has been stored in register R2, another arithmetic operation is performed that adds the value in register R2 to the value in register R0. The final instruction specifies another arithmetic operation that multiplies the value in register R0 by 0.25 to generate an average value for the four texture operations. As shown in FIG. 7C, the processor must be stalled at each of the arithmetic operations while the texture units generate texture values to be stored in the register.

It will be appreciated that the programs illustrated by pseudocode 710, pseudocode 720, and pseudocode 730 arrive at the same result. The program illustrated by pseudocode 710 requires eight registers to be allocated, the program illustrated by pseudocode 720 only requires five registers (including the accumulator register) to be allocated, and the pseudocode 730 only requires six registers to be allocated. However, the program illustrated by pseudocode 710 enables all four high latency texture operations to be executed in parallel, thereby hiding some of the latency associated with the texture operations. In contrast, the program illustrated by pseudocode 730 requires the texture operations to be issued in sequence to avoid overwriting a result in the shared register R2, thereby slowing down the overall operation.

As shown in FIG. 7B, reductive operation trees can be expressed more efficiently using local accumulators and operation chaining techniques. At least some of the operations in pseudocode 720 may be executed out-of-order as well. However such techniques may suffer from exposing high-latency operations that cause the processor to stall frequently.

FIG. 7D illustrates pseudocode 740 annotated to indicate which instructions can be executed out-of-order, in accordance with one embodiment. As shown in FIG. 7D, the first instruction specifies a first texture operation that receives input from register R0 and stores an output in register R0, thereby overwriting the input. The second instruction specifies a second texture operation that receives input from register R1 and stores an output in register R4. The third instruction specifies an arithmetic instruction that sums the values in register R0 and register R4 and stores the result in register R0. The additional instructions specify additional texture operations and additional arithmetic operations that generate two additional texture values, sum the texture values with the value in register R0, and multiply the summed texture values by 0.25 to generate an average texture value. A software module (e.g., a compiler) may analyze the program code described above and annotate the code using the semantics shown in FIG. 7D. Each of the arithmetic instructions that add values to an initial value in register R0 includes an instruction prefix. The instruction prefix (e.g., (texture)) may be used to indicate a memory consistency model (e.g., global, local, shared, etc.). The memory-consistency model may be used to allocate out-of-order instructions to the different virtual queues, A {texture} instruction prefix may be aliased to the global memory-consistency model. As the processor, i.e., SM 150 or scheduler unit 210, receives instructions, the processor may add instructions specified by the compiler as instructions that can be executed out-of-order to the various virtual queues based on the memory-consistency models indicated by the instruction prefixes. An operation that is coupled (i.e., dependent) on other instructions and not-reordered is a synchronous operation. An operation that is re-ordered is an asynchronous operation. An operation A is ordered in front of an operation B if A is a synchronous operation that is program-ordered before B, A is an asynchronous operation dependency-ordered before B, or A and B are both asynchronous operations and A is memory-ordered before B. Program-ordered means the operation occurs first in the order of operations transmitted to the processor. An operation A is dependency-ordered before an operation B if A is a synchronous operation and A is program-ordered before B and B reads a register or memory location written by A. An asynchronous operation A is memory-ordered before an asynchronous operation B if A is dependency-ordered before B, A is executed in the same virtual queue as B and A is program-ordered before B, or A is program-ordered before a memory barrier C and C is program ordered before B. Such rules enable the processor to perform out-of-order execution of various program instructions marked by the compiler as able to be executed asynchronously.

The software module may analyze code, such as code represented by pseudocode 710, pseudocode 720, or pseudocode 730, and generate new code, such a code represented by pseudocode 740, that includes the inserted predicates for implementing out-of-order processing using the virtual queues. The predicates may be translated into metadata included with the machine code instructions transmitted to a processing unit. The processing unit may then analyze the metadata to determine whether the associated instruction may be executed out-of-order.

Figure 8:
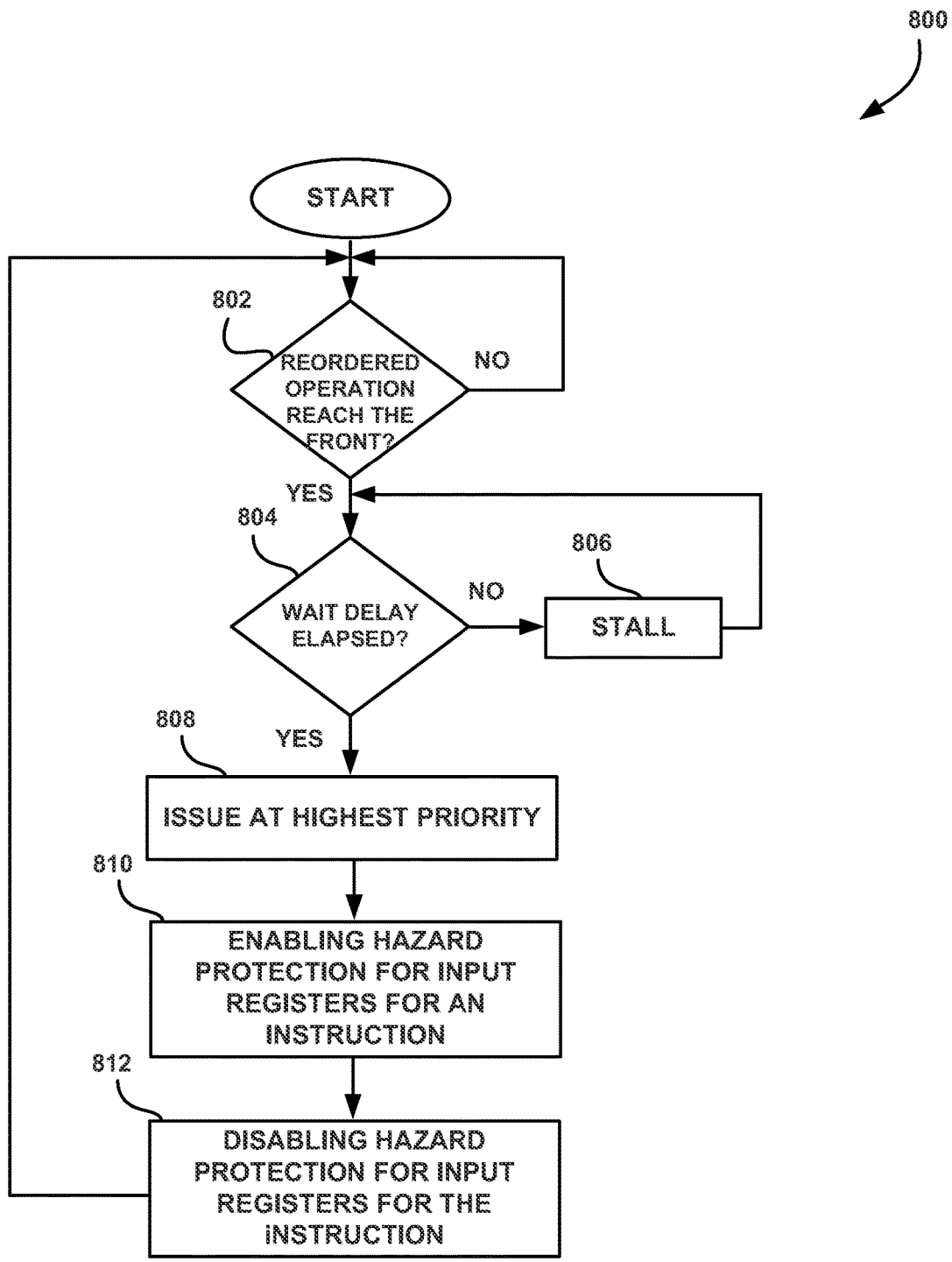
FIG. 8 illustrates a flowchart of a method for dispatching out-of-order instructions, in accordance with one embodiment.

FIG. 8 illustrates a flowchart of a method 800 for dispatching out-of-order instructions, in accordance with one embodiment. At step 802, the dispatch unit 215 determines whether a reordered operation has reached the front of a ready-to-execute queue. In one embodiment, the dispatch unit 215 implements a priority-based arbitration scheme to determine which instructions in the queue should be issued during the next available clock cycle. In such embodiments, the instruction at the front of the queue is the instruction with the highest priority that is ready to be executed. If the instruction at the front of the ready-to-execute queue is not a reordered operation (i.e., the instruction is associated with metadata that indicates the instruction cannot be executed out-of-order), then the method 800 returns to step 802 to wait for the next instruction to reach the front of the ready-to-execute queue. However, if the instruction at the front of the ready-to-execute queue is a reordered operation (i.e., the instruction is associated with metadata that indicates the instruction can be executed out-of-order), then the method proceeds to step 804 where the dispatch unit 215 determines if a wait delay has elapsed. In one embodiment, the wait delay ensures that the instruction cannot be decoded and issued unless at least N clock cycles (e.g., 6 clock cycles) have elapsed since the last reductive operator instruction was issued. If the wait delay has not elapsed, then the method proceeds to step 806 where the dispatch unit 215 stalls the issuance of the instruction. In one embodiment, the dispatch unit 215 may issue the next highest priority instruction. However, if the wait delay has elapsed, then the method proceeds to step 808. At step 808, the dispatch unit 215 issues the instruction at the highest priority.

In one embodiment, the scheduler unit 210 tracks state associated with issued instructions. For example, the scheduler unit 210 may track how many instructions are in flight (i.e., the difference between the number of instructions that have issued and the number of instructions that have completed execution). At step 810, the dispatch unit 215 enables hazard protection for the input registers for an instruction. In one embodiment, scoreboarding techniques may be used to implement hazard protection using counters. At step 812, the dispatch unit 215 disables hazard protection for the input registers for the instruction. After step 812, the method 800 returns to step 802 to wait for the next reordered instruction.

Figure 9:
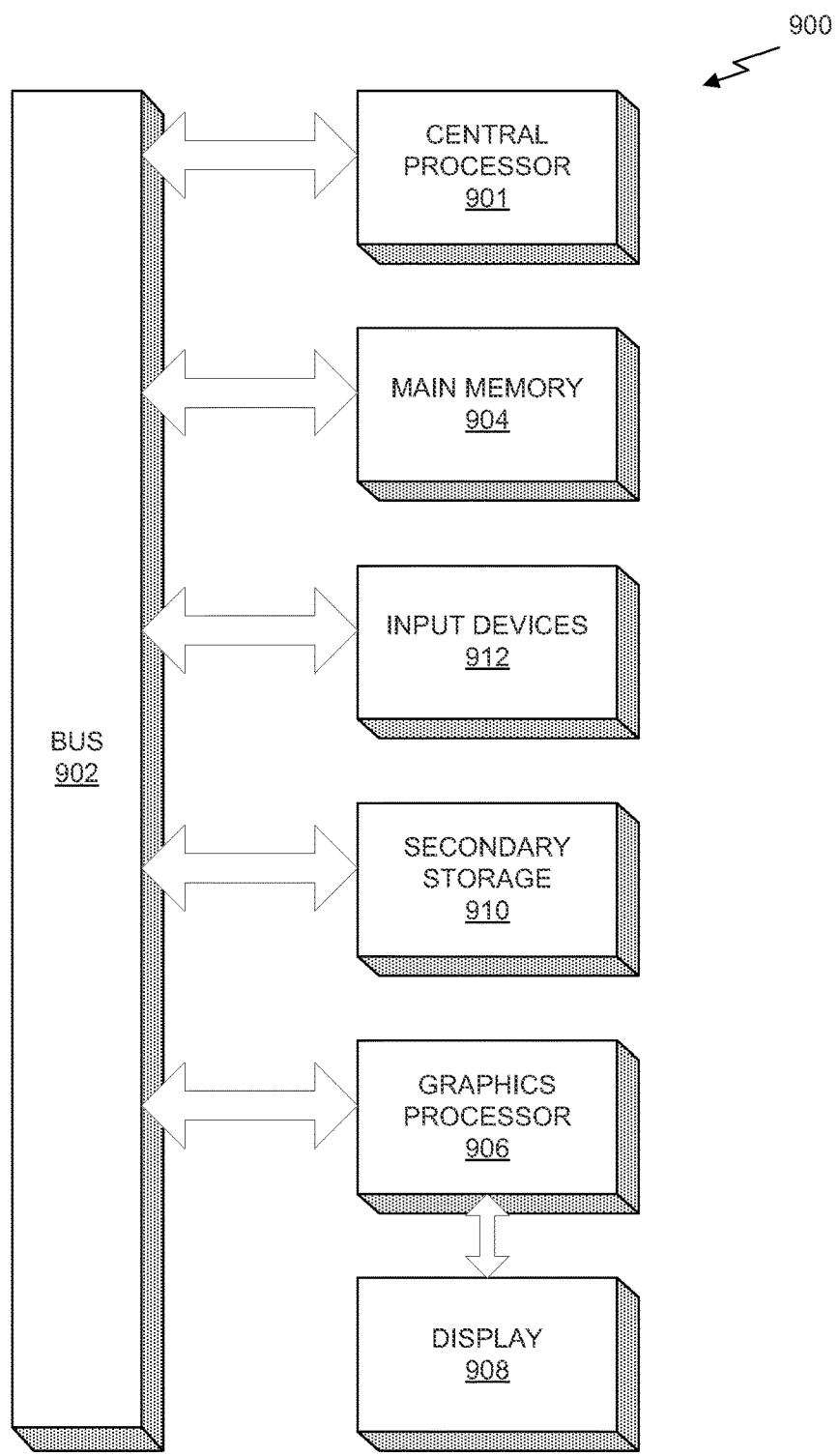
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU). In one embodiment, the BVH 400 may be encoded using either the processor 901 or the graphics processor 906.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. For example, the compiler implemented in a driver kernel for the PPU 100 may be such a program. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a plurality of instructions by a processor;
identifying, by a scheduler unit within the processor, a subset of instructions in the plurality of instructions to be executed out-of-order by inspecting metadata associated with the plurality of instructions; and
for each instruction in the subset of instructions, the scheduler unit adds the instruction to a virtual queue specified by metadata for the instruction, wherein the virtual queue is one of a plurality of virtual queues implemented in an on-chip random access memory (RAM), and wherein each virtual queue in the plurality of virtual queues is implemented as a circular FIFO in the RAM.

2. The method of claim 1, wherein the metadata includes an identifier that specifies a particular virtual queue in the plurality of virtual queues.

3. The method of claim 1, wherein the metadata is embedded within the instructions.

4. The method of claim 1, wherein the subset of instructions to be executed out-of-order include arithmetic instructions.

5. The method of claim 1, further comprising enabling hazard protection for input registers associated with a particular instruction when at least one of the instructions to be executed out-of-order is dispatched.

6. The method of claim 1, further comprising disabling hazard protection for the input registers associated with the particular instruction when the particular instruction completes execution.

7. The method of claim 1, wherein the metadata is stored separately from the instructions.

8. The method of claim 1, wherein the processor includes a scheduling unit that is configured to identify the subset of instructions and add the instructions to the plurality of virtual queues.

9. The method of claim 8, wherein the processor includes a dispatch unit that is configured to receive an instruction from a particular virtual queue associated with a functional unit of the processor and issue the instruction from the particular virtual queue only after a delay of N clock cycles since a previous instruction from the particular virtual queue was issued by the dispatch unit.

10. The method of claim 1, wherein the plurality of instructions implement a reductive texture sampling program that includes one or more texture operations.

11. A non-transitory computer-readable storage medium storing instructions that, when executed by a processor, cause the processor to perform steps comprising:
receiving a plurality of instructions by the processor;
identifying, by a scheduler unit within the processor, a subset of instructions in the plurality of instructions to be executed out-of-order by inspecting metadata associated with the plurality of instructions; and
for each instruction in the subset of instructions, the scheduler unit adds the instruction to a virtual queue specified by metadata for the instruction, wherein the virtual queue is one of a plurality of virtual queues implemented in an on-chip random access memory (RAM), and wherein each virtual queue in the plurality of virtual queues is implemented as a circular FIFO in the RAM.

12. The non-transitory computer-readable storage medium of claim 11, the steps further comprising enabling hazard protection for input registers associated with a particular instruction when at least one of the instructions to be executed out-of-order is dispatched.

13. The non-transitory computer-readable storage medium of claim 12, the steps further comprising disabling hazard protection for the input registers associated with the particular instruction when the particular instruction completes execution.

14. The non-transitory computer-readable storage medium of claim 11, wherein the metadata is embedded within the instructions.

15. The non-transitory computer-readable storage medium of claim 11, wherein the processor includes a scheduling unit that is configured to identify the subset of instructions and add the instructions to the plurality of virtual queues; and a dispatch unit that is configured to receive an instruction from a particular virtual queue associated with a functional unit of the processor and issue the instruction from the particular virtual queue only after a delay of N clock cycles since a previous instruction from the particular virtual queue was issued by the dispatch unit.

16. The non-transitory computer-readable storage medium of claim 11, wherein the plurality of instructions implement a reductive texture sampling program that includes one or more texture operations.

17. A system, comprising:
a processor configured to:
  receive a plurality of instructions;
  identify, by a scheduler unit within the processor, a subset of instructions in the plurality of instructions to be executed out-of-order by inspecting metadata associated with the plurality of instructions; and
  for each instruction in the subset of instructions, the scheduler unit adds the instruction to a virtual queue specified by metadata for the instruction, wherein the virtual queue is one of a plurality of virtual queues implemented in an on-chip random access memory (RAM), and wherein each virtual queue in the plurality of virtual queues is implemented as a circular FIFO in the RAM.

18. The system of claim 17, wherein the processor comprises a graphics processing unit.

19. The system of claim 17, wherein the metadata is embedded within the instructions.

20. The system of claim 17, wherein the processor includes a scheduling unit that is configured to identify the subset of instructions and add the instructions to the plurality of virtual queues; and a dispatch unit that is configured to receive an instruction from a particular virtual queue associated with a functional unit of the processor and issue the instruction from the particular virtual queue only after a delay of N clock cycles since a previous instruction from the particular virtual queue was issued by the dispatch unit.

* * * * *